United States Patent
Takaoka et al.

(10) Patent No.: US 10,519,840 B2
(45) Date of Patent: Dec. 31, 2019

(54) ABNORMALITY DIAGNOSIS SYSTEM FOR EXHAUST GAS PURIFICATION APPARATUS

(71) Applicant: TOYOTA JIDOSHA KABUSHIKI KAISHA, Toyota-shi, Aichi-ken (JP)

(72) Inventors: Kazuya Takaoka, Machida (JP); Toru Kidokoro, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/038,869

(22) Filed: Jul. 18, 2018

(65) Prior Publication Data
US 2019/0024564 A1 Jan. 24, 2019

(30) Foreign Application Priority Data
Jul. 20, 2017 (JP) .................. 2017-141207

(51) Int. Cl.
*F01N 11/00* (2006.01)
*F01N 3/20* (2006.01)
*F01N 9/00* (2006.01)

(52) U.S. Cl.
CPC ............ *F01N 11/00* (2013.01); *F01N 3/2006* (2013.01); *F01N 9/00* (2013.01); *F01N 2430/06* (2013.01); *F01N 2550/02* (2013.01); *F01N 2900/1614* (2013.01)

(58) Field of Classification Search
CPC .. F01N 3/0871; F01N 3/0885; F01N 2550/02; F01N 2550/03; F01N 2900/1624
See application file for complete search history.

(56) References Cited

U.S. PATENT DOCUMENTS 6,244,046 B1 * 6/2001 Yamashita ............ F01N 3/0842
60/276
2001/0054282 A1 * 12/2001 Lang .................. B01D 53/9495
60/277
(Continued)

FOREIGN PATENT DOCUMENTS

JP 2010-236458 10/2010
JP 2011-157892 8/2011
(Continued)

*Primary Examiner* — Jonathan R Matthias
(74) *Attorney, Agent, or Firm* — Finnegan, Henderson, Farabow, Garrett & Dunner, LLP

(57) ABSTRACT

An object of the disclosure is to provide a technology that enables abnormality diagnosis of an NOx trap catalyst to make the diagnosis that the NOx trap catalyst is abnormal even if the degree of deterioration of the NOx trap catalyst is relatively small yet. When performing abnormality diagnosis of an NOx trap catalyst, a system according to the disclosure performs a lean temperature raising process, which is the process of raising the temperature of the NOx trap catalyst to or above a predetermined temperature while keeping the air-fuel ratio of the exhaust gas flowing into the NOx trap catalyst at a lean air-fuel ratio. The system diagnoses abnormality of the NOx trap catalyst on the basis of the NOx storage efficiency of the NOx trap catalyst or a parameter correlating with that NOx storage efficiency after the completion of the lean temperature raise process.

6 Claims, 10 Drawing Sheets

(56) References Cited

U.S. PATENT DOCUMENTS

| | | | | |
|---|---|---|---|---|
| 2003/0093988 A1* | 5/2003 | Surnilla | ................ | F01N 3/0842 |
| | | | | 60/274 |
| 2011/0308235 A1* | 12/2011 | Bisaiji | ................ | F02D 41/0275 |
| | | | | 60/301 |
| 2017/0362980 A1 | 12/2017 | Nakada et al. | | |

FOREIGN PATENT DOCUMENTS

| JP | 2013-181453 | 9/2013 |
|---|---|---|
| JP | 2016-133064 | 7/2016 |
| JP | 2016-211484 | 12/2016 |

* cited by examiner

ABNORMALITY DIAGNOSIS SYSTEM FOR EXHAUST GAS PURIFICATION APPARATUS

CROSS REFERENCE TO RELATED APPLICATION

This application claims the benefit of Japanese Patent Application No. 2017-141207, filed on Jul. 20, 2017, which is hereby incorporated by reference herein in its entirety.

TECHNICAL FIELD

The present disclosure relates to an abnormality diagnosis system for an exhaust gas purification apparatus of a lean-burn internal combustion engine.

BACKGROUND ART

It is known in prior art to provide an NOx trap catalyst as an exhaust gas purification catalyst in an exhaust passage of lean-burn internal combustion engines that operate at lean air-fuel ratios higher than the theoretical air-fuel ratio. The NOx trap catalyst has the function of storing NOx in the exhaust gas when the air-fuel ratio of the exhaust gas is a lean air fuel ratio. It should be understood that the expression "storing NOx" (along with its derivatives) used in this specification also means adsorbing NOx. As the NOx trap catalyst as such, an NOx storage reduction catalyst (which will also be referred to as "NSR catalyst" hereinafter) is used in some cases. The NSR catalyst has the function of storing NOx in the exhaust gas when the exhaust gas has a lean air-fuel ratio and reducing NOx stored therein when the exhaust gas has an air-fuel ratio equal to or lower than the theoretical air-fuel ratio and a reducing agent is present. It should be noted that the NOx trap catalysts also include catalysts that have the function of storing NOx in the exhaust gas but do not have the function of reducing NOx stored therein.

Patent Literatures 1 to 3 disclose technologies relating to assessing deterioration of an NSR catalyst in systems in which the NSR catalyst is provided as an NOx trap catalyst in an exhaust passage of an internal combustion engine. Patent Literature 1 discloses a system including an NOx sensor provided in the exhaust passage downstream of an NSR catalyst. The NOx sensor has the property of sensing not only NOx in the exhaust gas but also $NH_3$. When a reducing agent (HC) is supplied to the NSR catalyst in which NOx is stored, the reducing agent and NOx react to produce $NH_3$. The amount of $NH_3$ thus produced depends on the amount of NOx stored in the NSR catalyst. The NOx storage capability of the NSR catalyst may decrease as it stores SOx in the exhaust gas. This is called SOx poisoning. If the NSR catalyst deteriorates due to increases in the amount of SOx deposited in a state in which recovery from the poisoning is impossible, the amount of NOx stored in the NSR catalyst becomes smaller than that in the NSR catalyst in a normal condition. In the technology disclosed in Patent Literature 1, the deterioration of the NSR catalyst is assessed on the basis of the measurement value of the NOx sensor when reducing agent is supplied to the NSR catalyst by making the air-fuel ratio of the exhaust gas rich. If the amount of NOx stored in the NSR catalyst is smaller due to deterioration of the NSR catalyst as described above, the quantity of $NH_3$ produced with the supply of reducing agent to the NSR catalyst is smaller. In consequence, the quantity (or the concentration) of $NH_3$ measured by the NOx sensor is smaller than that in the case where the NSR catalyst is in a normal condition. Therefore, it is possible to assess the deterioration of the NSR catalyst on the basis of the measurement value of the NOx sensor at the time when reducing agent is supplied to the NSR catalyst.

Patent Literature 2 describes that when the process of recovery from SOx poisoning of the NSR catalyst (namely the process of desorbing SOx stored in the NSR catalyst from it) or the process of regenerating a filter provided in the exhaust passage upstream of the NSR catalyst (namely the process of removing particulate matter trapped in the filter by combustion) is performed, the temperature of the NSR catalyst becomes high to cause desorption of NOx stored in the NSR catalyst (high-temperature regeneration). In the technology disclosed in Patent Literature 2, the deterioration of the NSR catalyst is assessed on the basis of the integrated amount of NOx stored into the NSR catalyst during the period after the desorption of NOx from the NSR catalyst by the high-temperature regeneration until the NOx storage capacity of the NSR catalyst is saturated.

Patent Literature 3 discloses a technology of assessing the deterioration of an NSR catalyst on the basis of the degree of change in the removal rate, which represents the difference in the NOx removal rate between before and after the NOx reduction process, namely the process of reducing NOx stored in the NSR catalyst.

Patent Literature 4 discloses a technology of correcting the length of the interval between the end of the NOx reduction process and the start of the next time NOx reduction process on the basis of the degree of deterioration of the NSR catalyst in an exhaust gas purification apparatus including an NSR catalyst.

CITATION LIST

Patent Literature

Patent Literature 1: Japanese Patent Application Laid-Open No. 2013-181453
Patent Literature 2: Japanese Patent Application Laid-Open No. 2010-236458
Patent Literature 3: Japanese Patent Application Laid-Open No. 2011-157892
Patent Literature 4: Japanese Patent Application Laid-Open No. 2016-133064
Patent Literature 5: Japanese Patent Application Laid-Open No. 2016-211484

SUMMARY OF INVENTION

Technical Problem

Various technologies pertaining to abnormality diagnosis of NOx trap catalysts have been developed, as exemplified by the technologies of assessing the deterioration of NSR catalysts disclosed the aforementioned prior art literatures. However, when the degree of deterioration of an NOx trap catalyst is relatively small, the decrease in the NOx storage amount in the NOx trap catalyst with the deterioration is also relatively small. Therefore, it is difficult in some cases to diagnose an NOx trap catalyst as abnormal when the degree of deterioration of the NOx trap catalyst is relatively small yet, for example in the case of a method of abnormality diagnosis of an NOx trap catalyst that is based on the amount of NOx stored in the NOx trap catalyst or a parameter correlating therewith that is calculated from a measurement value of an NOx sensor provided in the exhaust passage downstream of the NOx trap catalyst.

The present disclosure has been made in view of the above problem, and an object of the present disclosure is to provide a technology that enables abnormality diagnosis of an NOx trap catalyst provided in an exhaust passage of a lean-burn internal combustion engine to make the diagnosis that the NOx trap catalyst is abnormal even when the degree of deterioration of the NOx trap catalyst is relatively small yet.

Solution to Problem

An abnormality diagnosis system for an exhaust gas purification apparatus according to the present disclosure may be applied to an exhaust gas purification system including an NOx trap catalyst provided in an exhaust passage of an internal combustion engine that operates in a lean burn mode to store NOx in exhaust gas and may comprise a controller comprising at least one processor configured to perform a lean temperature raise process, which is the process of raising the temperature of said NOx trap catalyst to or above a predetermined temperature while keeping the air-fuel ratio of the exhaust gas flowing into said NOx trap catalyst at a lean air-fuel ratio higher than the theoretical air-fuel ratio, when a specific abnormality diagnosis condition is met, and diagnose abnormality of said NOx trap catalyst on the basis of the NOx storage efficiency of said NOx trap catalyst or a parameter correlating with that NOx storage efficiency after the completion of said lean temperature raise process.

The NOx storage efficiency of the NOx trap catalyst refers to the rate of the quantity of NOx stored into the NOx trap catalyst to the quantity of NOx flowing into the NOx trap catalyst. When the NOx storage amount (i.e. the amount NOx stored) in the NOx trap catalyst exceeds a certain amount, the NOx storage efficiency decreases gradually with increases in the NOx storage amount. The inventor of the present disclosure has discovered that if the lean temperature raise process or the process of raising the temperature of the NOx trap catalyst to or above a predetermined temperature while keeping the air-fuel ratio of the exhaust gas flowing into the NOx trap catalyst lean is performed, the NOx storage efficiency of the NOx trap catalyst is more apt to decrease with increases in the NOx storage amount in the NOx trap catalyst after the completion of the lean temperature raise process. This phenomenon is considered to be ascribable to deterioration in the functions of a precious metal catalyst and an NOx storage material on the NOx trap catalyst in storing NOx, which will occur if the temperature of the NOx trap catalyst rises or above the predetermined temperature while the air-fuel ratio is lean. More specifically, it is considered that if the temperature of the NOx trap catalyst rises to or above the predetermined temperature when the air-fuel ratio is lean, oxygen poisoning of the precious metal catalyst and coarsening of the NOx storage material occur on the NOx trap catalyst, making the NOx storage efficiency of the NOx trap catalyst more apt to decrease.

When the NOx trap catalyst is deteriorated, its NOx storage efficiency after the completion of the lean temperature raise process is more apt to decrease than when the NOx trap catalyst is normal. It is considered that this is because when the NOx trap catalyst is deteriorated, its NOx storage efficiency is affected to an increased extent by deterioration in the functions of precious metal catalyst and the NOx storage material caused by the lean temperature raise process. The oxygen poisoning of the precious metal catalyst and the coarsening of the NOx storage material in the NOx trap catalyst can be removed by making the air-fuel ratio of the exhaust gas flowing into the NOx trap catalyst rich.

When the NOx trap catalyst is deteriorated, the NOx storage efficiency of the NOx trap catalyst is smaller than when the NOx trap catalyst is normal, even if the NOx storage amount in the NOx trap catalyst is the same. As described above, when the NOx trap catalyst is deteriorated, the deterioration in the NOx storage efficiency after the completion of the lean temperature raise process tends to be increased. In consequence, the difference between in the NOx storage efficiency between the NOx trap catalyst in a deteriorated condition and the NOx trap catalyst in a normal condition for the same NOx storage amount in the NOx trap catalyst becomes larger after the completion of the lean temperature raise process.

In the present disclosure, the controller may perform the lean temperature raise process, when a specific condition for performing abnormality diagnosis is met. Then, the controller may diagnose abnormality of the NOx trap catalyst on the basis of the NOx storage efficiency of the NOx trap catalyst or the parameter correlating with that storage efficiency after the completion of the lean temperature raise process. Thus, abnormality diagnosis of the NOx trap catalyst is performed in circumstances in which the difference in the NOx storage efficiency between the NOx trap catalyst in a deteriorated (or abnormal) condition and the NOx trap catalyst in a normal condition is increased. Therefore, even when the degree of deterioration of the NOx trap catalyst is relatively small yet, it is possible to make the diagnosis that the NOx trap catalyst is abnormal. It should be understood that the abnormality diagnosis of the NOx trap catalyst based on the NOx storage efficiency of the NOx trap catalyst according to the present disclosure includes not only abnormality diagnosis that is performed using the value of the NOx storage efficiency itself of the NOx trap catalyst as a parameter but also abnormality diagnosis that is performed using the degree of change in the NOx storage efficiency of the NOx trap catalyst as a parameter.

Even when the air-fuel ratio of the exhaust gas flowing into the NOx trap catalyst is lean, it is possible to desorb NOx stored in the NOx trap catalyst by raising the temperature of the NOx trap catalyst. In this connection, the predetermined temperature in the lean temperature raise process may be set to a temperature at which NOx stored in the NOx trap catalyst can be desorbed when the air-fuel ratio of the exhaust gas flowing into the NOx trap catalyst is lean. Then, the NOx storage amount in the NOx trap catalyst can be decreased to substantially zero by performing the lean temperature raise process. In consequence, after the completion of the lean temperature raise process, the NOx storage amount in the NOx trap catalyst gradually increases from substantially zero. Thus, performing the lean temperature raise process to desorb NOx stored in the NOx trap catalyst can make the NOx storage amount in the NOx trap catalyst substantially constant before acquiring the value of the NOx storage efficiency of the NOx trap catalyst or the parameter correlating with the NOx storage efficiency as a parameter used in abnormality diagnosis. This improves the accuracy of abnormality diagnosis of the NOx trap catalyst based on the NOx storage efficiency of the NOx trap catalyst or the parameter correlating with that NOx storage efficiency after the completion of the lean temperature raise process.

The NOx trap catalyst employed with the present disclosure may be an NSR catalyst. In that case, the controller may further perform an NOx reduction process, which is the processor reducing NOx stored in the NOx trap catalyst by decreasing the air-fuel ratio of the exhaust gas flowing into the NOx trap catalyst to a reductive air-fuel ratio equal to or lower than the theoretical air-fuel ratio at which NOx can be reduced. In the case where this configuration is employed, the controller may perform the NOx reduction process when the specific abnormality diagnosis condition is met, and then the controller may perform the lean temperature raise process.

The system employing the above-described configuration can reduce NOx stored in the NOx trap catalyst by performing the NOx reduction process before performing the lean temperature raise process. In consequence, desorption of NOx from the NSR catalyst with the lean temperature raise process can be prevented or reduced. Therefore, it is possible to prevent or reduce emission of NOx desorbed from the NSR catalyst to the environment with the lean temperature raise process.

After the completion of the NOx reduction process, the NOx storage amount in the NOx trap catalyst becomes substantially zero. If the lean temperature raise process is not performed after the completion of the NOx reduction process, the NOx storage amount in the NOx trap catalyst increases gradually. The manner of change of the NOx storage efficiency of the NOx trap catalyst with increases in the NOx storage amount in the NOx trap catalyst is different between the NOx trap catalyst in a deteriorated condition and the NOx trap catalyst in a normal condition. However, the NOx reduction process hardly causes deterioration in the functions of the precious metal catalyst and the NOx storage material on the NOx trap catalyst that will be caused when the lean temperature raise process is performed. Hence, after the completion of the NOx reduction process, the difference in the NOx storage efficiency for the same NOx storage amount in the NOx trap catalyst between the NOx trap catalyst in a deteriorated condition and the NOx trap catalyst in a normal condition hardly become as large as that after the completion of the lean temperature raise process.

Therefore, in the system according to the present disclosure, even in the case where the NOx trap catalyst is an NSR catalyst and the controller performs the NOx reduction process, the controller performs the lean temperature raise process when abnormality diagnosis of the NOx trap catalyst is to be performed. Then, the controller diagnoses abnormality of the NOx trap catalyst on the basis of the NOx storage efficiency of the NOx trap catalyst or the parameter correlating with that NOx storage efficiency after the completion of the lean temperature raise process.

The exhaust gas purification apparatus to which the present disclosure is applied may include an NOx reduction catalyst disposed in the exhaust passage downstream of the NOx trap catalyst at a location a predetermined distance or more away from the NOx trap catalyst. The NOx reduction catalyst may be selective catalytic reduction NOx catalyst (which will be also referred to as "SCR catalyst" hereinafter) or an NSR catalyst. Since the NOx reduction catalyst is disposed in the exhaust passage at a location a predetermined distance or more away from the NOx trap catalyst, even when the temperature of the NOx trap catalyst is raised, the temperature of the NOx reduction catalyst is prevented from rising. Therefore, in the case where the NOx reduction catalyst is an SCR catalyst, in performing the lean temperature raise process, the controller may raise the temperature of the NOx trap catalyst to or above the predetermined temperature while keeping the temperature of the NOx reduction catalyst within a specific reduction-enabling temperature range in which the NOx reduction catalyst can reduce NOx. In the case where the NOx reduction catalyst is an NSR catalyst, in performing the lean temperature raise process, the controller may raise the temperature of the NOx trap catalyst to or above the predetermined temperature while keeping the temperature of the NOx reduction catalyst within a specific storage-enabling temperature range in which the NOx reduction catalyst can store NOx. With this configuration, even though NOx is desorbed from the NOx trap catalyst when the lean temperature raise process is performed, the NOx reduction catalyst can store or reduce the desorbed NOx. Therefore, the NOx desorbed from the NSR catalyst with the lean temperature raise process is prevented from being emitted to the environment.

The present disclosure enables abnormality diagnosis of an NOx trap catalyst provided in an exhaust passage of a lean-burn internal combustion engine to make the diagnosis that the NOx trap catalyst is abnormal even when the degree of deterioration of the NOx trap catalyst is relatively small yet.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless otherwise stated.

First Embodiment

Basic Structure

Figure 1:
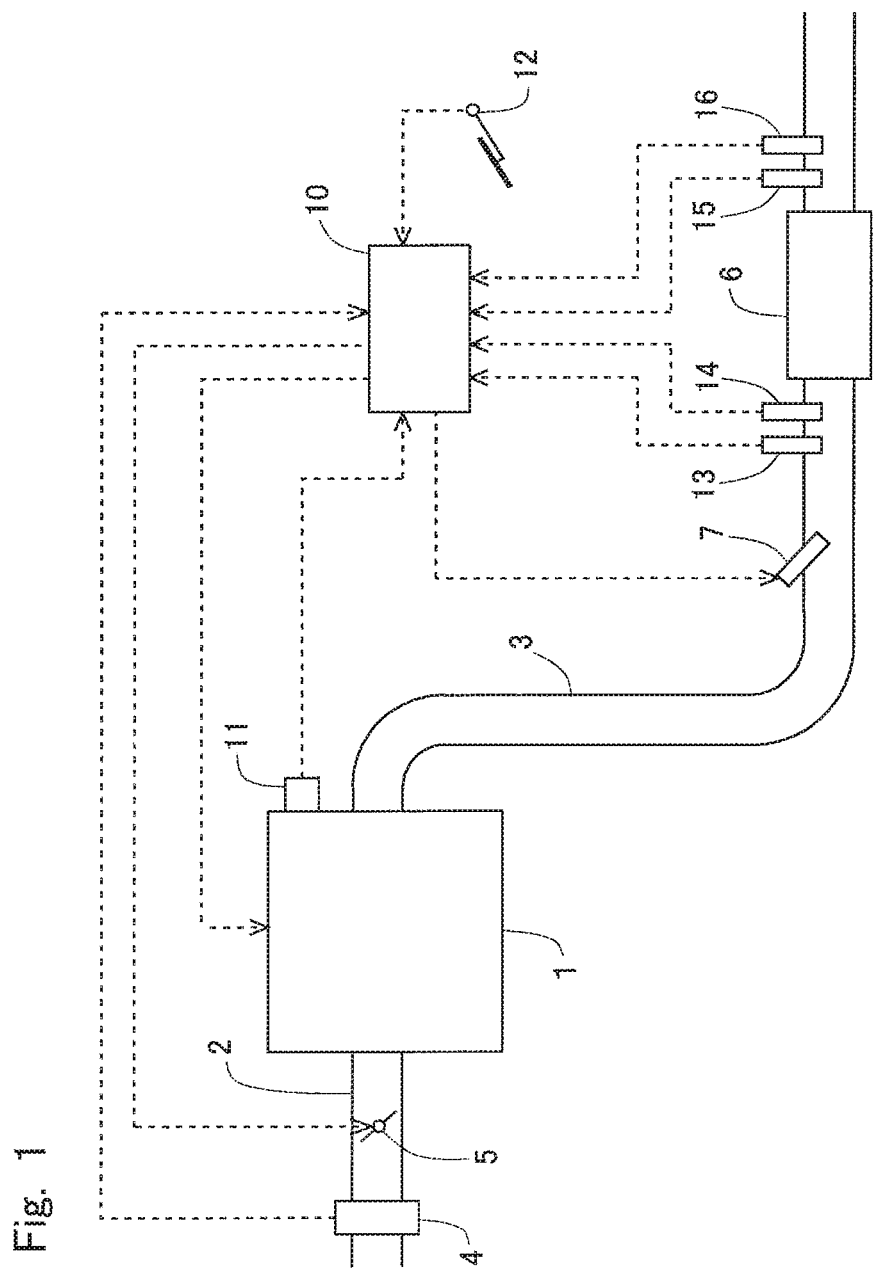
FIG. 1 is a diagram showing the general configuration of air-intake and exhaust systems of an internal combustion engine according to a first embodiment.

In the following a case where the present disclosure is applied to an exhaust gas purification apparatus for a diesel engine for driving a vehicle will be described by way of example. FIG. 1 is a diagram showing the general configuration of air-intake and exhaust systems of an internal combustion engine according to a first embodiment. The internal combustion engine 1 is a diesel engine for driving a vehicle. It should be noted, however, that the present disclosure can also be applied to an exhaust gas purification apparatus for a gasoline engine that operates in a lean-burn mode.

The internal combustion engine 1 is connected with an intake passage 2 and an exhaust passage 3. The intake passage 2 is provided with an air flow meter 4. The air flow meter 4 measures the intake air quantity of the internal combustion engine 1. The intake passage 2 downstream of the air flow meter 4 is provided with a throttle valve 5. The throttle valve 5 is capable of varying the channel cross sectional area in the intake passage 2 to control the intake air quantity of the internal combustion engine 1.

The exhaust passage 3 is provided with an NSR catalyst 6 as an exhaust gas purification catalyst. The NSR catalyst 6 has not only the function of storing and reducing NOx but also the oxidizing function. The exhaust passage 3 upstream of the NSR catalyst 6 is provided with a fuel addition valve 7. The fuel addition valve 7 is capable of adding fuel to the exhaust gas. The fuel added through the fuel addition valve 7 is supplied to the NSR catalyst 6 with the exhaust gas.

The exhaust passage 3 downstream of the fuel addition valve 7 and upstream of the NSR catalyst 6 is provided with an upstream NOx sensor 13 and an air-fuel ratio sensor 14. The upstream NOx sensor 13 measures the NOx concentration in the exhaust gas flowing into the NSR catalyst 6 (which will also be referred to as the "inflowing exhaust gas" hereinafter). The air-fuel ratio sensor 14 measures the air-fuel ratio of the inflowing exhaust gas. The upstream NOx sensor 13 is not necessarily provided. In cases where the upstream NOx sensor 13 is absent, the NOx concentration in the inflowing exhaust gas may be estimated on the basis of the operation state of the internal combustion engine 1. The air-fuel ratio sensor 14 is not necessarily provided. In cases where the air-fuel ratio sensor 14 is absent, the air-fuel ratio of the inflowing exhaust gas may be estimated on the basis of the operation state of the internal combustion engine 1 and the quantity of fuel added through the fuel addition valve 7. Alternatively, the air-fuel ratio of the inflowing exhaust gas may be determined using the upstream NOx sensor 13. The exhaust passage 3 downstream of the NSR catalyst 6 is provided with a downstream NOx sensor 15 and a temperature sensor 16. The downstream NOx sensor 15 measures the NOx concentration in the exhaust gas flowing out of the NSR catalyst 6 (which will also be referred to as the "outflowing exhaust gas" hereinafter). The temperature sensor 16 measures the temperature of the outflowing exhaust gas.

An electronic control unit (ECU) 10 is provided for the internal combustion engine 1 to control it. The ECU 10 is electrically connected with the air flow meter 4, the upstream NOx sensor 13, the air-fuel ratio sensor 14, the downstream NOx sensor 15, and the temperature sensor 16. The ECU 10 is also electrically connected with a crank angle sensor 11 and an accelerator opening degree sensor 12. The crank angle sensor 11 outputs a signal related to the crank angle of the internal combustion engine 1. The accelerator opening degree sensor 12 outputs a signal related to the accelerator opening degree of the vehicle provided with the internal combustion engine 1.

The measurement values of the aforementioned sensors are input to the ECU 10. The ECU 10 calculates the engine speed of the internal combustion engine 1 on the basis of the measurement value of the crank angle sensor 11. The ECU 10 calculates the engine load of the internal combustion engine 1 on the basis of the measurement value of the accelerator opening degree sensor 12. The ECU 10 calculates the inflowing NOx quantity, which is defined as the quantity of NOx flowing into the NSR catalyst 6, on the basis of the measurement values of the air flow meter 4 and the upstream NOx sensor 13. The ECU 10 calculates the outflowing NOx quantity, which is defined as the quantity of NOx flowing out of the NSR catalyst 6, on the basis of the measurement values of the air flow meter 4 and the downstream NOx sensor 15. The ECU 10 calculates the temperature of the NSR catalyst 6 on the basis of the measurement value of the temperature sensor 16. Another temperature sensor arranged upstream of the NSR catalyst 6 may be provided in addition to the temperature sensor 16 arranged downstream of the NSR catalyst 6, and the temperature of the NSR catalyst 6 may be calculated from the measurement values of the two temperature sensors. Alternatively, the temperature of the NSR catalyst 6 is directly measured by a temperature sensor.

Figure 2:
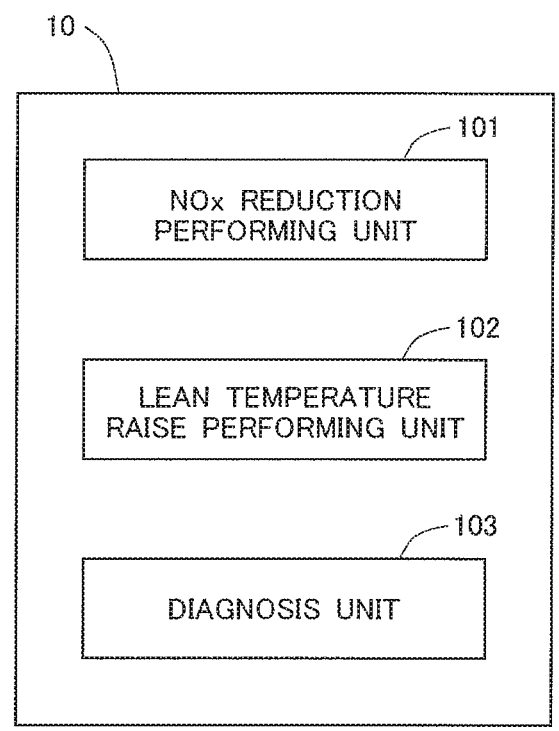
FIG. 2 is a block diagram showing functional blocks in the ECU 10 according to the first embodiment.

Moreover, the ECU 10 is also electrically connected with a fuel injection valve (not shown), the throttle valve 5, and the fuel addition valve 7 of the internal combustion engine 1. These valves are controlled by the ECU 10. FIG. 2 is a block diagram showing functional blocks included in the ECU 10. As shown in FIG. 2, the ECU 10 has an NOx reduction performing unit 101, a lean temperature raise performing unit 102, and a diagnosis unit 103. The NOx reduction performing unit 101 is a functional block that performs an NOx reduction process that will be described later. The lean temperature raise performing unit 102 is a functional block that performs a lean temperature raise process that will be described later. The diagnosis unit 103 is a functional block that performs failure diagnosis of the NSR catalyst 6 that will be described later. These functional blocks are constituted by executing specific control programs in the ECU 10.

NOx Reduction Process

Now, the NOx reduction process performed by the NOx reduction performing unit 101 of the ECU 10 will be described. In this embodiment, the ECU 10 calculates the quantity of NOx flowing into the NSR catalyst 6 and the quantity of NOx flowing out of the NSR catalyst 6, as described above. Moreover, the ECU 10 estimates the NOx storage amount in the NSR catalyst 6 (namely, the amount of NOx stored in the NSR catalyst 6) from of the calculated values of the inflowing NOx quantity and the outflowing NOx quantity. Specifically, the ECU 10 estimates the NOx storage amount in the NSR catalyst 6 by integrating the inflowing NOx quantity as the increase of the NOx storage amount and the outflowing NOx quantity as the decrease of the NOx storage amount while the internal combustion engine 1 is running. When the estimated value of the NOx storage amount reaches a predetermined storage amount, the NOx reduction performing unit 101 performs the NOx reduction process in order to recover the NOx storage capability of the NSR catalyst 6.

In the NOx reduction process, secondary fuel injection is performed by the fuel injection valve at time after the time of main fuel injection at such timing that the injected fuel will not be used in combustion thereby temporarily reducing the air-fuel ratio of the inflowing exhaust gas to a predetermined reductive air-fuel ratio. The predetermined reductive air-fuel ratio is an air-fuel ratio equal to or lower than the theoretical air-fuel ratio, which is determined in advance for example experimentally as an air-fuel ratio that enables reduction of NOx stored in the NSR catalyst 6. If the NOx reduction process is performed, NOx is desorbed from the NSR catalyst 6, and the desorbed NOx is reduced in the NSR catalyst 6 by reducing agent (such as HC) contained in the fuel. The NOx reduction process can be performed by adding fuel to the exhaust gas through the fuel addition valve 7 instead of the secondary fuel injection through the fuel injection valve, alternatively.

Abnormality Diagnosis of NSR Catalyst

Next, a method of abnormality diagnosis of the NSR catalyst according to the embodiment will be described. In this embodiment, as described above, the ECU 10 calculates the inflowing NOx quantity and the outflowing NOx quantity using the measurement values of the upstream NOx sensor 13 and the downstream NOx sensor 15 and estimates the NOx storage amount in the NSR catalyst 6 by integrating these quantities. As deterioration of the NSR catalyst 6 progresses, the NOx storage efficiency of the NSR catalyst 6 (i.e. the ratio of the quantity of NOx stored (or taken) into the NSR catalyst 6 to the inflowing NOX quantity) decreases. In other words, as deterioration of the NSR catalyst 6 progresses, the quantity of NOx stored into the NSR catalyst 6 decreases, even if the inflowing NOx quantity is the same. Consequently, the estimated value of the NOx storage amount in the NSR catalyst 6 also decreases. Therefore, it appears that it is possible to diagnose abnormality of the NSR catalyst 6 on the basis of the estimated value of the NOx storage amount in the NSR catalyst or a parameter correlating with the NOx storage amount.

However, when the degree of deterioration of the NSR catalyst 6 is relatively small, the decrease in the NOx storage amount in the NSR catalyst resulting from the deterioration is also small. Therefore, if abnormality diagnosis of the NSR catalyst 6 is performed simply on the basis of the estimated value of the NOx storage amount in the NSR catalyst 6 or a parameter correlating with the NOx storage amount, it is difficult in some cases to diagnose the NSR catalyst 6 as abnormal when the degree of deterioration of the NSR catalyst 6 is small yet. In this embodiment, when abnormality diagnosis of the NSR catalyst 6 is performed, a lean temperature raise process is performed, which is the process of raising the temperature of the NSR catalyst 6 to or above a predetermined temperature while keeping the air-fuel ratio of the inflowing exhaust gas lean. The predetermined temperature mentioned above is such a temperature at which NOx stored in the NSR catalyst 6 can be desorbed when the air-fuel ratio of the inflowing exhaust gas is lean. The predetermined temperature as such is determined in advance by, for example, experiment.

The lean temperature raise process is performed by the lean temperature raise performing unit 102 of the ECU 10. In the lean temperature raise process, fuel is supplied to the NSR catalyst 6 by adding fuel to the exhaust gas through the fuel addition valve 7. The fuel supplied to the NSR catalyst 6 is oxidized, and the temperature of the NSR catalyst 6 is raised by the heat of oxidation generated thereby. In the lean temperature raise process, the addition of fuel through the fuel addition valve 7 is controlled in such a way as to raise the temperature of the NSR catalyst 6 to or above the predetermined temperature while keeping the air-fuel ratio of the inflowing exhaust gas measured by the air-fuel ratio sensor 14 lean. As the lean temperature raise process is performed, NOx is desorbed from the NSR catalyst 6. Since the air-fuel ratio of the inflowing exhaust gas is lean during this process, the desorbed NOx is not reduced in the NSR catalyst 6 and flows out of the NSR catalyst 6. The lean temperature raise process can also be implemented by performing secondary fuel injection by the fuel injection valve in each cylinder of the internal combustion engine 1 as with the above-described NOx reduction process, instead of fuel addition by the fuel addition valve 7.

Figure 3:
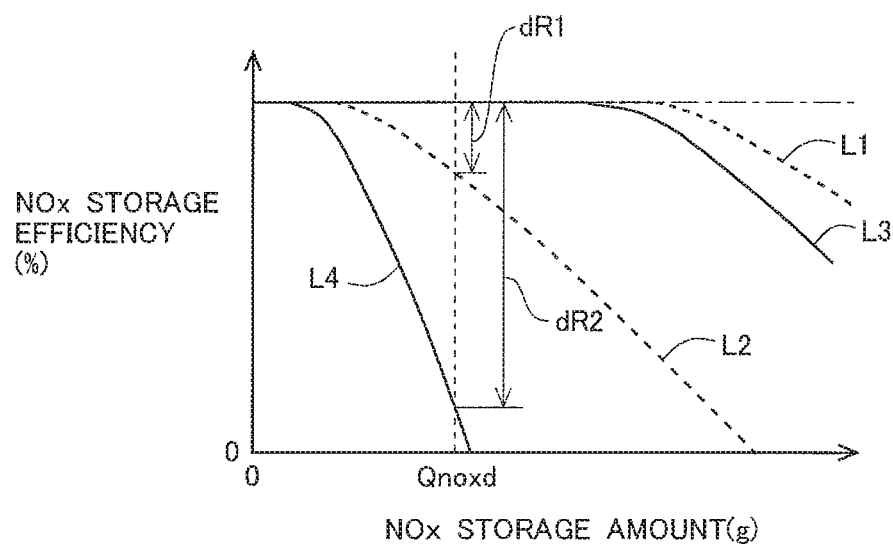
FIG. 3 is a graph showing the change in the NOx storage efficiency of an NSR catalyst after the completion of the NOx reduction process and that after the completion of the lean temperature raise process.

In the following, effects of performing the lean temperature raise process will be described. FIG. 3 is a graph showing the change in the NOx storage efficiency of the NSR catalyst 6 after the completion of the NOx reduction process and that after the completion of the lean temperature raise process. In FIG. 3, the vertical axis represents the NOx storage efficiency of the NSR catalyst 6 with increases in the NOx storage amount, and the horizontal axis represents the NOx storage amount in the NSR catalyst 6. In FIG. 3, broken curve L1 represents the change in the NOx storage efficiency after performing the NOx reduction process in a case where the NSR catalyst 6 is in a normal condition, and broken curve L2 represents the change in the NOx storage efficiency after performing the NOx reduction process in a case where the NSR catalyst 6 is deteriorated. In FIG. 3, solid curve L3 represents the change in the NOx storage efficiency after performing the lean temperature raise process in a case where the NSR catalyst 6 is in a normal condition, and solid curve L4 represents the change in the NOx storage efficiency after performing the lean temperature raise process in a case where the NSR catalyst 6 is deteriorated.

In both of the NOx reduction process and the lean temperature raise process, the NOx storage amount in the NSR catalyst 6 after the completion of the process is substantially zero. Therefore, both in the case where the NOx reduction process is performed and in the case where the lean temperature raise process is performed, the NOx storage efficiency of the NSR catalyst 6 is highest at the time immediately after the completion of the process. In FIG. 3, the time at which the NOx storage amount in the NSR catalyst 6 is zero corresponds to the time of completion of the NOx reduction process or the lean temperature raise process. After the completion of either process, the NOx storage amount in the NSR catalyst 6 increases with the lapse of time. As the NOx storage amount in the NSR catalyst 6 increases after the completion of either process, the NOx storage efficiency of the NSR catalyst 6 decreases. As shown in FIG. 3, both after the completion of the NOx reduction process and after the completion of the lean temperature raise process, the NOx storage amount in the NSR catalyst 6 at the time when the NOx storage efficiency starts to decrease is smaller in the case where the NSR catalyst 6 is deteriorated (L2, L4) than in the case where the NSR catalyst 6 is normal (L1, L3).

In comparison of the changes in the NOx storage efficiency in the case where the NSR catalyst 6 is normal, the NOx storage amount in the NSR catalyst 6 at the time when the NOx storage efficiency starts to decrease is smaller after the completion of the lean temperature raise process (L3) than after the completion of the NOx reduction process (L1). After the start of decrease in the NOx storage efficiency, the decrease in the NOx storage efficiency per unit increase in the NOx storage amount in the NSR catalyst 6 is lager after the completion of the lean temperature raise process (L3) than after the completion of the NOx reduction process (L1). The decrease in the NOx storage efficiency per unit increase in the NOx storage amount in the NSR catalyst 6 will also be referred to as the "decrease rate of the NOx storage efficiency" hereinafter. In comparison of the changes in the NOx storage efficiency in the case where the NSR catalyst 6 is deteriorated also, the NOx storage amount in the NSR catalyst 6 at the time when the NOx storage efficiency starts to decrease is smaller after the completion of the lean temperature raise process (L4) than after the completion of the NOx reduction process (L2). After the start of decrease in the NOx storage efficiency, the decrease rate of the NOx storage efficiency is higher after the completion of the lean temperature raise process (L4) than after the completion of the NOx reduction process (L2).

After the completion of the NOx reduction process or the lean temperature raise process, the decrease rate of the NOx storage efficiency after the start of decrease of the NOx storage efficiency is higher in the case where the NSR catalyst is deteriorated (L2, L4) than in the case where the NSR catalyst is normal (L1, L3). In this connection, the difference between the decrease rate of the NOX storage efficiency in the case where the NSR catalyst 6 is normal and that in the case where the NSR catalyst 6 is deteriorated is larger after the completion of the lean temperature raise process than after the completion of the NOx reduction process.

Figure 4:
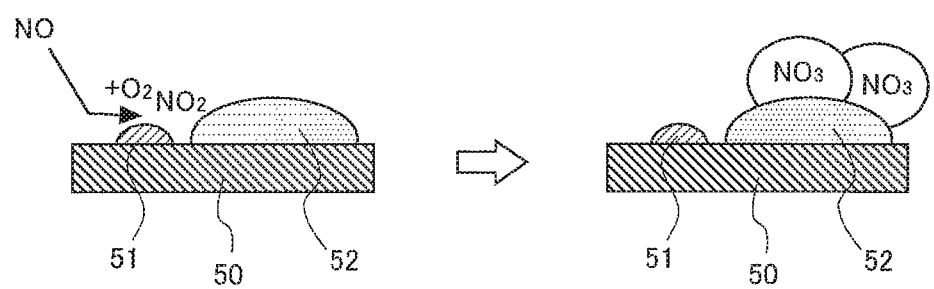
FIG. 4 is a schematic diagram illustrating the mechanism of storage of NOx into the NSR catalyst.

Although both in the case where the NOx reduction process is performed and in the case where the lean temperature raise process is performed the NOx storage amount in the NSR catalyst becomes substantially equal to zero at the time of completion of the process, the NOx storage efficiency of the NSR catalyst 6 changes in different manners after the completion of the respective processes as shown in FIG. 3. The phenomenon to which this difference is considered to be ascribable will be described in the following with reference to FIGS. 4 and 6. FIG. 4 is a schematic diagram illustrating the mechanism of storage of NOx into an NSR catalyst. The NSR catalyst includes a catalyst carrier 50 made of alumina or the like and a precious metal catalyst 51 made of platinum (Pt), rhodium (Rh), or palladium (Pd) supported on the catalyst carrier 50. Moreover, an NOx storage material 52 made of an alkaline earth metal such as barium (Ba) is also supported on the catalyst carrier 50. Here, we will describe reactions that may occur in the NSR catalyst in an exemplary case where the precious metal catalyst 51 is platinum (Pt) and the NOx storage material 52 is barium (Ba).

In normal cases (namely, in cases where the temperature of the NSR catalyst is lower than the predetermined temperature in the lean temperature raise process), when the air-fuel ratio of the inflowing exhaust gas is lean, a portion of NO in the exhaust gas is oxidized into $NO_2$ on the platinum (Pt) supported on the catalyst carrier 50, as shown in the left diagram in FIG. 4. $NO_2$ generated in this way is stored as $NO_3$ in barium (Ba) 52 supported on the catalyst carrier 50, as shown in the right diagram in FIG. 4. Specifically, $NO_2$ is converted into barium nitrate $(Ba(NO_3)_2)$ through the reaction expressed by the following chemical equation and stored in the NSR catalyst.

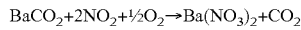

$$BaCO_3 + 2NO_2 + \tfrac{1}{2}O_2 \rightarrow Ba(NO_3)_2 + CO_2$$

Figure 5:
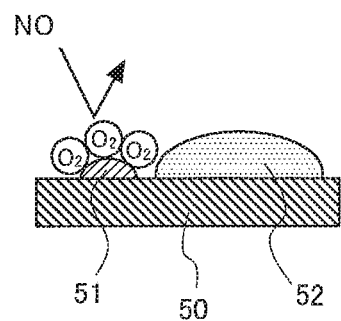
FIG. 5 is a first schematic diagram illustrating the state of the NSR catalyst in the case where the lean temperature raise process is performed.
Figure 6:
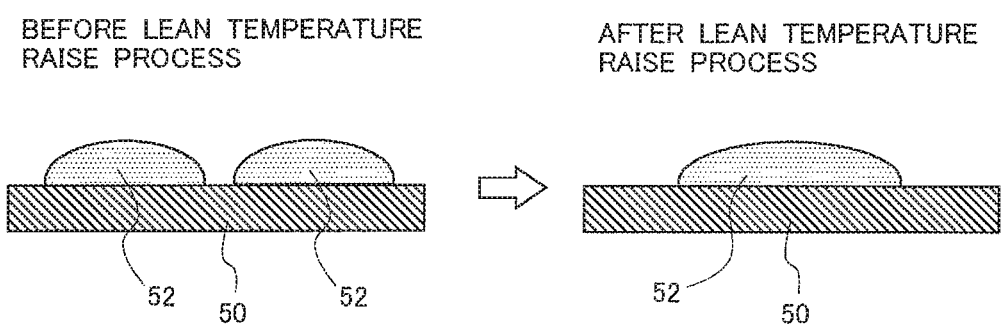
FIG. 6 is a second schematic diagram illustrating the state of the NSR catalyst in the case where the lean temperature raise process is performed.

FIGS. 5 and 6 are schematic diagrams illustrating the state of the NSR catalyst in the case where the lean temperature raise process is performed. As described above, when the lean temperature raise process is performed, the temperature of the NSR catalyst rises to or above the predetermined temperature while the air-fuel ratio of the inflowing exhaust gas is kept lean. Performing the lean temperature raise process in this way can cause oxygen poisoning, that is, oxidation of platinum (Pt) 51 supported on the catalyst carrier 50. The oxygen poisoning of platinum (Pt) 51 continues even after the completion of the lean temperature raise process, as long as the air-fuel ratio of the inflowing exhaust gas is lean. Then, NO in the exhaust gas becomes less likely to be oxidized on platinum (Pt) 51. In other words, NO in the exhaust gas becomes less likely to be converted to $NO_2$. In consequence, the quantity of NOx stored into the NSR catalyst by conversion from $NO_2$ to barium nitrate $(Ba(NO_3)_2)$ decreases.

When the lean temperature raise process is performed, barium (Ba) particles 52 located close to each other on the catalyst carrier 50 may be bound together, so that the barium (Ba) 52 may be coarsened. Then, the surface area of the barium (Ba) on the catalyst carrier 50 will become smaller than that before performing the lean temperature raise process. This will lead to a decrease in the contact area of the barium (Ba) and $NO_2$. In consequence, even if $NO_2$ is produced by oxidation of NO on the platinum (Pt) 51 supported on the catalyst carrier 50, the quantity of NOx stored into the NSR catalyst by conversion from $NO_2$ to barium nitrate $(Ba(NO_3)_2)$ will decrease.

As described above, performing the lean temperature raise process causes oxygen poisoning of the precious metal catalyst 51 (e.g. platinum Pt) and coarsening of the NOx storage material 52 (e.g. barium Ba) in the NSR catalyst 6. In consequence, after the lean temperature raise process is performed, the NSR catalyst 6 may be in a condition in which it is not apt to store NOx. Thus, after the completion of the lean temperature raise process, the NSR catalyst 6 is considered to be in a condition in which the NOx storage efficiency tends to be low. The above-described oxygen poisoning of the precious metal catalyst 51 and coarsening of the NOx storage material 52 in the NSR catalyst 6 caused by the lean temperature raise process can be dissolved if the air-fuel ratio of the inflowing exhaust gas is made rich.

In the NOx reduction process, the air-fuel ratio of the inflowing exhaust gas is controlled to a predetermined reductive air-fuel ratio that is lower than the theoretical air-fuel ratio. In consequence, oxygen poisoning of the precious metal catalyst 51 or coarsening of the NOx storage material 52 hardly occurs in the NSR catalyst 6. Therefore, after completion of the NOx reduction process, the NSR catalyst 6 is considered to be in a condition in which it is more apt to store NOx than after the completion of the lean temperature raise process.

When the NSR catalyst 6 is deteriorated, the NOx storage efficiency is already more apt to decrease than when the NSR catalyst 6 is normal. Therefore, if oxygen poisoning of the precious metal catalyst 51 and coarsening of the NOx storage material 52 occur due to the lean temperature raise process when the NSR catalyst 6 is deteriorated, the NOx storage efficiency is apt to be affected by the oxygen poisoning and coarsening to a larger extent than when the NSR catalyst 6 is normal. Thus, when the NSR catalyst 6 is deteriorated, the decrease of the NOx storage efficiency after the completion of the lean temperature raise process tends to be larger.

It is considered that due to the occurrence of the above-described phenomena, the NOx storage efficiency of the NSR catalyst 6 starts to decrease earlier and the decrease rate of the NOx storage efficiency is larger after the completion of the lean temperature raise process than after the completion of the NOx reduction process. Furthermore, it is considered that due to the above-described phenomena, the difference between the decrease rate of the NOx storage efficiency in the case where the NSR catalyst 6 is normal and that in the case where the NSR catalyst 6 is deteriorated is larger after the completion of the lean temperature raise process than after the completion of the NOx reduction process.

Since the NOx storage efficiency of the NSR catalyst 6 changes in different manners as described above between after the completion of the NOx reduction process and after the completion of the lean temperature raise process, the difference between the NOx storage efficiency in the case where the NSR catalyst 6 is deteriorated and that in the case where the NSR catalyst 6 is normal at the same NOx storage amount in the NSR catalyst 6 is larger after the completion of the lean temperature raise process than after the completion of the NOx reduction process. Thus, as shown in FIG. 3, the difference between the NOx storage efficiency in the case where the NSR catalyst 6 is deteriorated and that in the case where the NSR catalyst 6 is normal at a specific NOx storage amount Qnoxd in the NSR catalyst 6 is larger after the completion of the lean temperature raise process than after the completion of the NOx reduction process (dR1<dR2 in FIG. 3).

In this embodiment, when abnormality diagnosis of the NSR catalyst 6 is to be performed, the lean temperature raise process is performed. Then, abnormality of the NSR catalyst 6 is diagnosed on the basis of the NOx storage efficiency of the NSR catalyst 6 after the completion of the lean temperature raise process. Thus, abnormality diagnosis of the NSR catalyst 6 is performed in circumstances in which the difference between the NOx storage efficiency in the case where the NSR catalyst 6 is deteriorated (or abnormal) and that in the case where the NSR catalyst is normal is increased. Therefore, the diagnosis that the NSR catalyst 6 is abnormal can be made even when the degree of deterioration of the NSR catalyst 6 is relatively small yet.

Process of Abnormality Diagnosis

Figure 7:
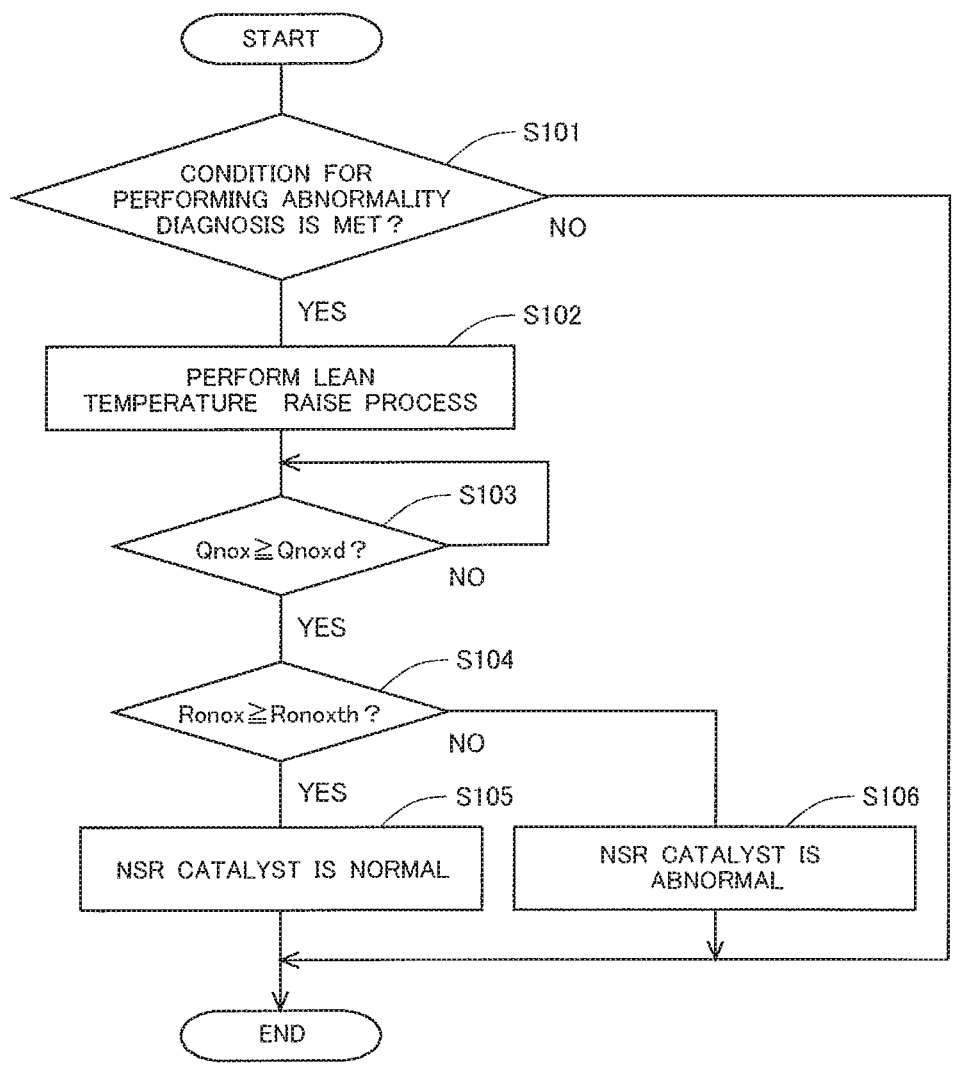
FIG. 7 is a flow chart of a process of abnormality diagnosis of the NSR catalyst according to the first embodiment.

The process of abnormality diagnosis of the NSR catalyst according to this embodiment will be described. With reference to a flow chart in FIG. 7. This process is implemented by executing a program stored in the ECU 10.

In this process, firstly in step S101, it is determined whether or not a condition for performing abnormality diagnosis of the NSR catalyst 6 is met. The condition for performing abnormality diagnosis includes, for example, that the temperature of the NSR catalyst 6 is an active temperature and that the internal combustion engine 1 is in a stationary operation state. If a negative determination is made in step S101, this process is terminated this time.

On the other hand, if an affirmative determination is made in step S101, then in step S102, the lean temperature raise performing unit 102 performs the lean temperature raise process. Specifically, the lean temperature raise performing unit 102 controls the quantity of fuel added through the fuel addition valve 7 and the intervals of the fuel addition in such a way as to keep the air-fuel ratio of the inflowing exhaust gas lean and to make the temperature of the NSR catalyst 6 equal to or higher than the predetermined temperature. The lean temperature raise process is performed for a predetermined temperature raise process time. The predetermined temperature raise process time is a length of time that is considered to be long enough for the NOx storage amount in the NSR catalyst 6 to decrease to substantially zero. The predetermined temperature raise process time may be a fixed length of time that is determined in advance by, for example, experiment. In this embodiment, the ECU 10 is continuously estimating the NOx storage amount in the NSR catalyst 6, as described above. The predetermined temperature raise process time may be determined on the basis of the NOx storage amount in the NSR catalyst 6 at the time when an affirmative determination is made in step S101.

After the lean temperature raise process has been performed for the predetermined temperature raise process time in step S102, the lean temperature raise process is ended. Then, storage of NOx into the NSR catalyst 6 starts again. Consequently, the NOx storage amount Qnox in the NSR catalyst 6 starts to increase. Then, in step S103, it is determined whether or not NOx storage amount Qnox in the NSR catalyst 6 is equal to or larger than a predetermined criterion storage amount Qnoxd. (the same value as the specific storage amount Qnoxd in FIG. 3). The predetermined criterion storage amount Qnoxd is a value of the storage amount Qnox at or above which there is a significant difference in the NOx storage efficiency between the NSR catalyst 6 in a normal condition and the NSR catalyst 6 in an abnormal condition after the completion of the lean temperature raise process. This value is determined in advance by, for example, experiment. If a negative determination is made in step S103, the NOx storage amount Qnox in the NSR catalyst 6 has not reached the predetermined criterion storage amount Qnoxd. Then, the processing of step S103 is executed again.

On the other hand, if an affirmative determination is made in step S103, then in step S104, it is determined whether or not the NOx storage efficiency Ronox of the NSR catalyst 6 at the time when the NOx storage amount Qnox in the NSR catalyst 6 reaches the predetermined criterion storage amount Qnoxd is equal to or larger than a predetermined threshold storage efficiency Ronoxth. The predetermined threshold storage efficiency Ronoxth is such a threshold value that if the NOx storage efficiency Ronox of the NSR catalyst 6 at the time when the NOx storage amount Qnox in the NSR catalyst 6 reaches the predetermined criterion storage amount Qnoxd after the completion of the lean temperature raise process is equal to or higher than the predetermined threshold storage efficiency Ronoxth, it may be concluded that the NSR catalyst 6 is normal. The predetermined threshold storage efficiency Ronoxth is determined in advance by, for example, experiment.

If an affirmative determination is made in step S104, then in step S105, the determination that the NSR catalyst 6 is normal is made. On the other hand, if a negative determination is made in step S104, then in step S106, the determination that the NSR catalyst 6 is abnormal is made. After the execution of the processing of step S105 or S106, the execution of this process is terminated this time. The processing of steps S104 to S106 is executed by the diagnosis unit 103 of the ECU 10.

The above-described process of abnormality diagnosis can diagnose abnormality of the NSR catalyst 6 on the basis of the NOx storage efficiency of the NSR catalyst 6 after the completion of the lean temperature raise process.

First Modification

A first modification of the abnormality diagnosis of the NSR catalyst according to the first embodiment will now be described. The NOx storage efficiency of the NSR catalyst 6 changes in different manners between after the completion of the NOx reduction process and after the completion of the lean temperature raise process as shown in FIG. 3. Parameters that can be used in abnormality diagnosis of the NSR catalyst 6 is not limited to the NOx storage efficiency of the NSR catalyst 6. A certain parameter correlating with the NOx storage efficiency of the NSR catalyst 6 after the completion of the lean temperature raise process may be used as a parameter in abnormality diagnosis of the NSR catalyst 6.

For example, as is obvious, the NOx storage amount in the NSR catalyst 6 after the completion of the NOx reduction process and the lean temperature raise process correlates with the NOx storage efficiency after the completion of the respective processes. Therefore, the NOx storage amount in the NSR catalyst 6 also changes in different manners necessarily between after the completion of the NOx reduction process and after the completion of the lean temperature raise process.

Figure 8:
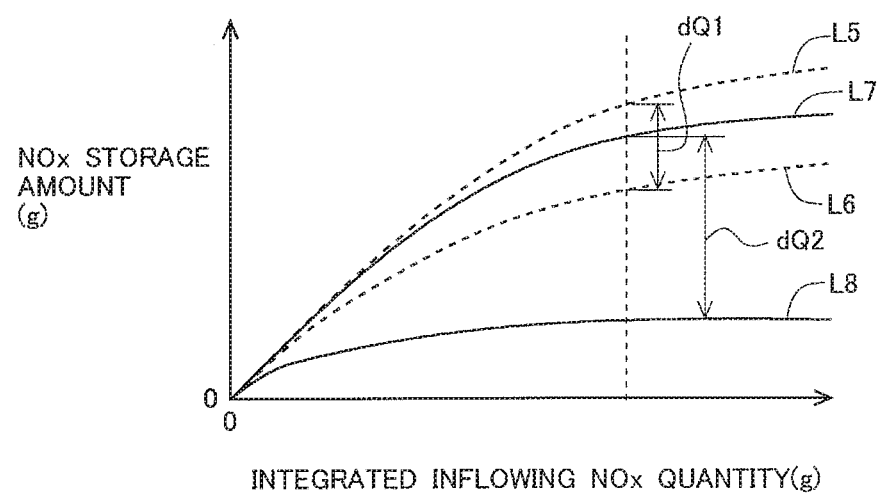
FIG. 8 is a graph showing the change in the NOx storage amount in the NSR catalyst after the completion of the NOx reduction process and after the completion of the lean temperature raise process.

FIG. 8 is a graph showing the change in the NOx storage amount in the NSR catalyst 6 with increases in the integrated inflowing NOx quantity after the completion of the NOx reduction process and after the completion of the lean temperature raise process. The vertical axis in FIG. 8 represents the NOx storage amount in the NSR catalyst 6. The horizontal axis in FIG. 8 represents the integrated value of the inflowing NOx quantity since the time of completion of the NOx reduction process or the time of completion of the lean temperature raise process. In FIG. 8, broken curve L5 represents the change in the NOx storage amount after the completion of the NOx reduction process in a case where the NSR catalyst 6 is normal, and broken curve L6 represents the change in the NOx storage amount after the completion of the NOx reduction process in a case where the NSR catalyst 6 is deteriorated. In FIG. 8, solid curve L7 represents the change in the NOx storage amount after the completion of the lean temperature raise process in a case where the NSR catalyst 6 is normal, and solid curve L8 represents the change in the NOx storage amount after the completion of the lean temperature raise process in a case where the NSR catalyst 6 is deteriorated.

After the completion of the NOx reduction process or the lean temperature raise process, the NOx storage amount in the NSR catalyst 6 increases in accordance with increase in the integrated value of the inflowing NOx quantity. As shown in FIG. 3, both after the completion of the NOx reduction process and after the completion of the lean temperature raise process, the NOx storage efficiency at the same NOx storage amount in the NSR catalyst 6 is lower in the case where the NSR catalyst 6 is deteriorated (L2, L4) than in the case where the NSR catalyst 6 is normal (L1, L3). In consequence, as shown in FIG. 8, both after the completion of the NOx reduction process and after the completion of the lean temperature raise process, the NOx storage amount in the NSR catalyst 6 at the same time (namely, at which the integrated value of the inflowing NOx quantity is the same) is smaller in the case where the NSR catalyst 6 is deteriorated (L6, L8) than in the case where the NSR catalyst is normal (L5, L7).

As shown in FIG. 3, both after the completion of the NOx reduction process and after the completion of the lean temperature raise process, the decrease rate of the NOx storage efficiency after the start of decrease of the NOx storage efficiency is higher in the case where the NSR catalyst 6 is deteriorated (L2, L4) than in the case where the NSR catalyst 6 is normal (L1, L3). Moreover, the difference between the decrease rate of the NOx storage efficiency in the case where the NSR catalyst 6 is normal and that in the case where the NSR catalyst 6 is deteriorated is larger after the completion of the lean temperature raise process than after the completion of the NOx reduction process. Hence, the difference in the NOx storage amount in the NSR catalyst 6 at the same time (namely, at which the integrated value of the inflowing NOx quantity is the same) between the case where the NSR catalyst 6 is normal and the case where the NSR catalyst 6 is deteriorated is larger after the completion of the lean temperature raise process than after the completion of the NOx reduction process (dQ1<dQ2 in FIG. 8).

In view of the above circumstances, in this modification, abnormality of the NSR catalyst 6 is diagnosed on the basis of the NOx storage amount in the NSR catalyst 6 after the completion of the lean temperature raise process. Thus, abnormality diagnosis of the NSR catalyst 6 is performed in circumstances in which the difference between the NOx storage amount in the case where the NSR catalyst 6 is deteriorated (or abnormal) and that in the case where the NSR catalyst 6 is normal is increased. Therefore, the diagnosis that the NSR catalyst 6 is abnormal can be made even when the degree of deterioration of the NSR catalyst 6 is relatively small yet, also in the case where NOx storage amount is used as a parameter in abnormality diagnosis instead of the NOx storage efficiency.

Figure 9:
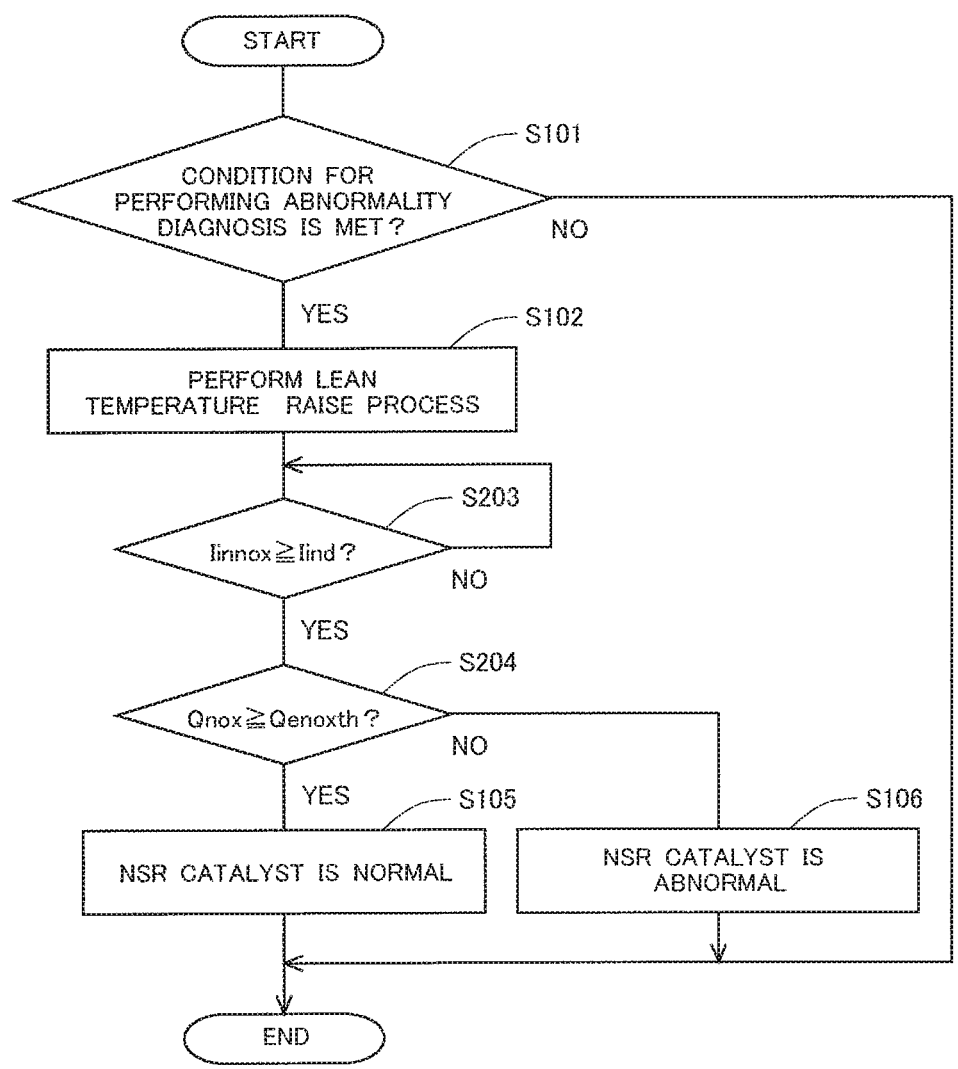
FIG. 9 is a flow chart of a process of abnormality diagnosis of the NSR catalyst according to the first embodiment.

The process of abnormality diagnosis of the NSR catalyst according to this modification will be described with reference to a flow chart in FIG. 9. This process is implemented by executing a program stored in the ECU 10. The processing executed in steps S101, S102, S105, and S106 in this process shown in FIG. 9 is the same as the processing executed in the steps denoted by the same reference signs in the abnormality diagnosis process shown in FIG. 7, and so the processing of these steps will not be described further.

In this process, when the lean temperature raise process performed in step S102 is ended, the processing of step S203 is executed next. In step S203, it is determined whether or not the integrated value Iinnox of the inflowing NOx quantity since the time when the lean temperature raise process is ended in step S102 is equal to or larger than a predetermined criterion integrated value Iind. The predetermined criterion integrated value Iind is a value at or above which there will be a significant difference in the NOx storage amount between the NSR catalyst 6 in a normal condition and the NSR catalyst 6 in an abnormal condition after the completion of the lean temperature raise process. The predetermined criterion integrated value Iind is determined in advance by, for example, experiment. In this embodiment, the ECU 10 may estimate the NOx storage amount in the NSR catalyst 6 after the completion of the lean temperature raise process on the assumption that the NSR catalyst 6 is in a specific normal condition on the basis of the inflowing NOx quantity and other factors. This NOx storage amount will be hereinafter referred to as the "specific normal NOx storage amount". In the case where such specific normal NOx storage amount in the NSR catalyst 6 is estimated, the specific normal NOx storage amount may be used in the processing of step S203 as a parameter in place of the integrate value Iinnox of the inflowing NOx quantity. In other words, in step S203, it may be determined whether or not the specific normal NOx storage amount is equal to or larger than a predetermined value.

If a negative determination is made in step S203, the integrated value Iinnox of the inflowing NOx quantity has not reached the criterion integrated value Iind yet. Then, the processing of step S203 is executed again. On the other hand, if an affirmative determination is made in step S203, then in step S204, it is determined whether or not the NOx storage amount Qnox in the NSR catalyst 6 at the time when the integrated value Iinnox of the inflowing NOx quantity reaches the predetermined criterion integrated value Iind is equal to or larger than a specific threshold storage amount Qenoxth. The specific threshold storage amount Qenoxth is such a value that if the NOx storage amount Qnox in the NSR catalyst 6 is equal to or larger than the specific threshold storage amount Qenoxth at the time when the integrated value Iinnox of the inflowing NOx quantity reaches the specific criterion integrated value Iind after the completion of the lean temperature raise process, it may be concluded that the NSR catalyst 6 is normal. The specific threshold storage amount Qenoxth is the NOx storage amount in the NSR catalyst 6 at the time when the integrated value. Iinnox of the inflowing NOx quantity reaches the specific criterion integrated value Iind in an assumed case in which the NSR catalyst 6 is in a most deteriorated condition (which will be referred to as "criterial condition") within the range in which the NSR catalyst 6 may be regarded as normal. In this embodiment, the ECU 10 is continuously estimating the NOx storage amount in the NSR catalyst 6 on the assumption that the NSR catalyst 6 is in a criterial condition on the basis of the inflowing NOx quantity. If an affirmative determination is made in step S204, the processing of step S105 is executed. If a negative determination is made in step S204, the processing of step S106 is executed. In this modification, the processing of steps S204, S105, and S106 is executed by the diagnosis unit 103 in the ECU 10.

Parameters correlating with the NOx storage efficiency of the NSR catalyst 6 after the completion of the lean temperature raise process are not limited to the NOx storage amount in the NSR catalyst 6 after the completion of the lean temperature raise process. For example, as is obvious, the integrated value of the inflowing NOx quantity until the NOx storage amount in the NSR catalyst 6 reaches a certain NOx storage amount after the completion of the lean temperature raise process correlates with the NOx storage efficiency of the NSR catalyst 6. Therefore, abnormality diagnosis of the NSR catalyst 6 may be performed on the basis of the integrated value of the inflowing NOx quantity until the NOx storage amount in the NSR catalyst 6 reaches a certain NOx storage amount after the completion of the lean temperature raise process.

Second Modification

A second modification of the abnormality diagnosis of the NSR catalyst according to the first embodiment will be described next. As described with reference to FIG. 3, after the completion of the NOx reduction process or the lean temperature raise process, the NOx storage efficiency of the NSR catalyst 6 starts to decrease when the NOx storage amount in the NSR catalyst 6 reaches a certain amount. Moreover, both after the completion of the NOx reduction process and after the completion of the lean temperature raise process, the decrease rate of the NOx storage efficiency after the start of decrease of the NOx storage efficiency is higher in the case where the NSR catalyst 6 is deteriorated (L2, L4) than in the case where the NSR catalyst 6 is normal (L1, L3). In this connection, the difference between the decrease rate of the NOX storage efficiency in the case where the NSR catalyst 6 is normal and that in the case where the NSR catalyst 6 is deteriorated is larger after the completion of the lean temperature raise process than after the completion of the NOx reduction process.

Figure 10:
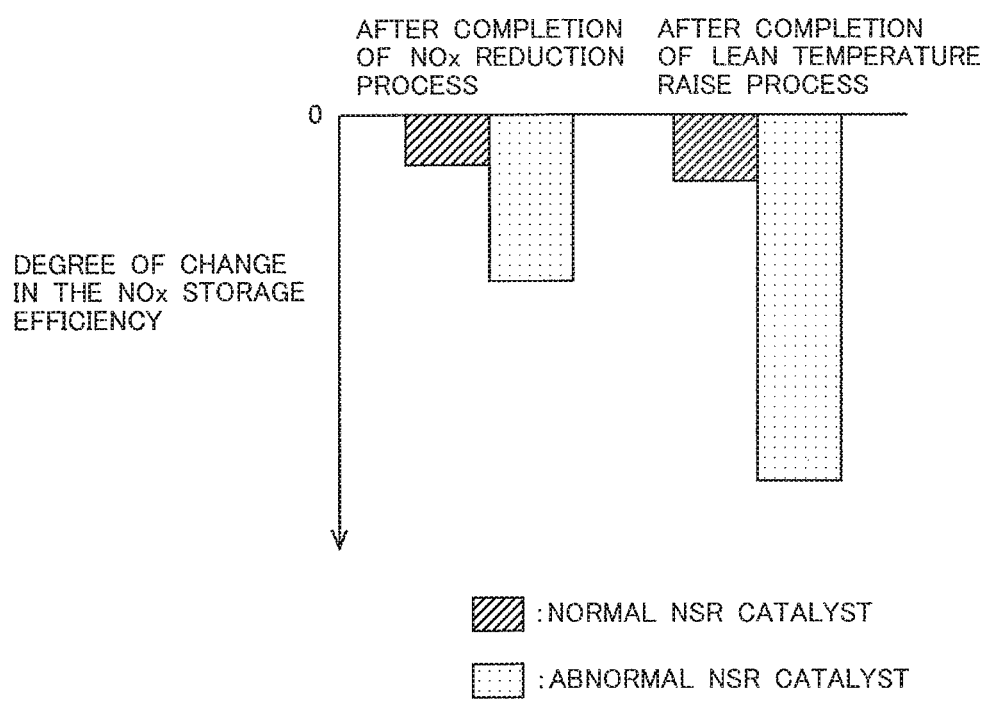
FIG. 10 is a diagram showing the degree of change in the NOx storage efficiency after the completion of the NOx reduction process and after the completion of the lean temperature raise process.

In this modification, given the above-described difference in the manner of change of the NOx storage efficiency, we will use the degree of change in the NOx storage efficiency after the completion of lean temperature raise process as a parameter in abnormality diagnosis of the NSR catalyst 6. FIG. 10 is a diagram showing the degree of change in the NOx storage efficiency calculated from the change in the NOx storage efficiency of the NSR catalyst 6 after the completion of the NOx reduction process and after the completion of the lean temperature raise process shown in FIG. 3. Here, the degree of change in the NOx storage efficiency refers to the rate of decrease in the NOx storage efficiency through the decrease in the NOx storage efficiency of the NSR catalyst from 100% to 50%. The degree of change in the NOx storage efficiency as such is calculated by the following equation 1. The degree of change in the NOx storage efficiency calculated by equation 1 is necessarily a negative value. It should be understood, however, that the equation that can be used to calculate the degree of change in the NOx storage efficiency is not limited to equation 1 below. The degree of change in the NOx storage efficiency can be defined as the rate of decrease in the NOx storage efficiency over any selected period through which the NOx storage efficiency of the NSR catalyst is decreasing with increases in the NOx storage amount in the NSR catalyst.

$$Cronox=(100-50)/(Qnoxf-Qnoxh) \qquad \text{(equation 1)},$$

where Cronox is the degree of change in the NOx storage efficiency, Qnoxf is the NOx storage amount in the NSR catalyst at the time when the NOx storage efficiency of the NSR catalyst starts to decrease from 100%, and Qnoxh is the NOx storage amount in the NSR catalyst at the time when the NOx storage efficiency of the NSR catalyst becomes equal to 50%.

FIG. 10 shows the degree of change in the NOx storage efficiency after the completion of the NOx reduction process and after the completion of the lean temperature raise process in the case where the NSR catalyst 6 is normal and that in the case where the NSR catalyst 6 is deteriorated (or abnormal). As shown in FIG. 10, both after the completion of the NOx reduction process and after the completion of the lean temperature raise process, the degree of change in the NOx storage efficiency is smaller in the case where the NSR catalyst 6 is abnormal than in the case where the NSR catalyst 6 is normal. Moreover, the difference between the degree of change in the NOx storage efficiency in the case where the NSR catalyst 6 is normal and that in the case where the NSR catalyst 6 is deteriorated larger after the completion of the lean temperature raise process than after the completion of the NOx reduction process.

Therefore, in the case where abnormality diagnosis of the NSR catalyst 6 is performed on the basis of the degree of change in the NOx storage efficiency after the completion of the lean temperature raise process, the diagnosis that the NSR catalyst 6 is abnormal can be made even when the degree of deterioration of the NSR catalyst 6 is relatively small yet, as in the case where abnormality diagnosis of the NSR catalyst 6 is performed on the basis of the raw value of the NOx storage efficiency of the NSR catalyst 6 after the completion of the lean temperature raise process.

Other Modifications

The predetermined temperature set the lean temperature raise process according to this embodiment is not necessarily limited to temperatures at which NOx stored in the NSR catalyst 6 is desorbed. So long as oxygen poisoning of the precious metal catalyst 51 and coarsening of the NOx storage material 52 are caused in the NSR catalyst 6 by performing the lean temperature raise process, the difference between the NOx storage efficiency in the case where the NSR catalyst 6 is deteriorated and that in the case where the NSR catalyst 6 is normal becomes larger after the completion of the lean temperature raise process than in the case where the lean temperature raise process is not performed, even if NOx is not desorbed from the NSR catalyst 6. Therefore, so long as the predetermined temperature set in the lean temperature raise process is a temperature at which oxygen poisoning of the precious metal catalyst 51 and coarsening of the NOx storage material 52 occur, it is possible to perform abnormality diagnosis of the NSR catalyst 6 in circumstances in which the difference between the NOx storage efficiency in the case where the NSR catalyst 6 is deteriorated and that in the case where the NSR catalyst 6 is normal is increased after the completion of the lean temperature raise process. Therefore, the diagnosis that the NSR catalyst 6 is abnormal can be made even when the degree of deterioration of the NSR catalyst 6 is relatively small yet.

In the case where abnormality diagnosis of the NSR catalyst 6 is to be performed on the basis of the NOx storage efficiency of the NSR catalyst 6 or a parameter correlating with that NOx storage efficiency, such as the NOx storage amount, after the completion of the lean temperature raise process, it is necessary to determine the NOx storage amount in the NSR catalyst 6 after the completion of the lean temperature raise process. Even in the case, for example, where the NOx storage efficiency of the NSR catalyst 6 after the completion of the lean temperature raise process is used as the parameter of abnormality diagnosis, the time to acquire the value of the NOx storage efficiency used as the parameter and the predetermined threshold storage efficiency Ronoxth serving as a threshold for abnormality diagnosis are determined according to the NOx storage amount in the NSR catalyst 6.

In this embodiment, as described above, the NOx storage amount in the NSR catalyst 6 is continuously estimated by the ECU 10. However, the estimated value of the NOx storage amount in the NSR catalyst 6 is calculated as the integrated value of the inflowing NOx quantity and the outflowing NOx quantity, and hence there may be a difference (or error) between the estimated value of the NOx storage amount and the actual NOx storage amount. In this respect, performing the lean temperature raise process, which makes the NOx storage amount in the NSR catalyst 6 substantially zero, can improve the accuracy of estimation of the NOx storage amount in the NSR catalyst 6 after the completion of the lean temperature raise process. Therefore, if the predetermined temperature set in the lean temperature raise process is a temperature at which NOx stored in the NSR catalyst 6 can be desorbed, the accuracy of abnormality diagnosis of the NSR catalyst 6 can be improved.

In this embodiment, the NSR catalyst 6 corresponds to the NOx trap catalyst according to the present disclosure. In this embodiment, the NSR catalyst 6 may be replaced by an NOx trap catalyst (which will be also referred to as "specific NOx trap catalyst" hereinafter provided in the exhaust passage 3 that has function of storing NOx but no function of reducing stored NOx. In this case, the method of abnormality diagnosis according to this embodiment may be applied to abnormality diagnosis of the specific NOx trap catalyst. In other words, the lean temperature raise process may be performed in abnormality diagnosis of the specific NOx trap catalyst, and abnormality of the specific NOx trap catalyst may be diagnosed on the basis of the NOx storage efficiency of the specific NOx trap catalyst after the completion of the lean temperature raise process or a certain parameter correlating with the NOx storage efficiency.

The specific NOx trap catalyst that does not have the function of reducing NOx also stores NOx in the exhaust gas by a mechanism same as the mechanism of storing NOx in the NSR catalyst shown in FIG. 4. The NOx storage efficiency of the specific NOx trap catalyst also decreases with increases in the NOx storage amount. Moreover, after the completion of the lean temperature raise process, the specific NOx trap catalyst is in a condition in which the NOx storage efficiency is apt to decrease. It is considered that this is because performing the lean temperature raise process causes oxygen poisoning of precious metal catalyst shown in FIG. 5 and coarsening of NOx storage material like the coarsening of NOx storage material shown in FIG. 6 in the specific NOx trap catalyst also.

In the following, the process of raising the temperature of the specific NOx trap catalyst while keeping the air-fuel ratio of the inflowing exhaust gas rich to desorb NOx from the specific NOx trap catalyst will be referred to as the rich temperature raise process. If NOx is desorbed from the specific NOx trap catalyst by the lean temperature raise process or the rich temperature raise process, the NOx storage amount in the specific NOx trap catalyst gradually increases thereafter. Then, the NOx storage efficiency decreases with increases in the NOx storage amount in the specific NOx trap catalyst. After the completion of either process, the NOx storage efficiency is more apt to decrease in the case where the specific NOx trap catalyst is deteriorated than in the case where the specific NOx trap catalyst is normal.

As with the NOx reduction process performed for the NSR catalyst, the rich temperature raise process hardly causes oxygen poisoning of the precious metal catalyst or coarsening of the NOx storage material in the specific NOx trap catalyst. Therefore, after the completion of the rich temperature raise process, the specific NOx trap catalyst is considered to be in a condition in which NOx is more apt to be stored into it than in the condition after the completion of the lean temperature raise process. When the specific NOx trap catalyst is deteriorated, the NOx storage efficiency is already more apt to decrease than when the specific NOx trap catalyst is normal. Therefore, if oxygen poisoning of the precious metal catalyst and coarsening of the NOx storage material occur due to the lean temperature raise process when the specific NOx trap catalyst is deteriorated, the NOx storage efficiency is apt to be affected by the oxygen poisoning and coarsening to a larger extent than when the specific NOx trap catalyst is normal. Thus, when the specific NOx trap catalyst is deteriorated, the decrease of the NOx storage efficiency after the completion of the lean temperature raise process tends to be larger.

Due to the occurrence of the above-described phenomena, there is a difference between the manner of change of the NOx storage efficiency of the specific NOx trap catalyst after the completion of the rich temperature raise process and that after the lean temperature raise process, which is similar to the difference between the manner of change of the NOx storage efficiency of the NSR catalyst 6 after the completion of the NOx reduction process and that after the completion of the lean temperature raise process shown in FIG. 3. In consequence, the difference between the NOx storage efficiency in the case where the specific NOx trap catalyst is deteriorated and that in the case where the specific NOx trap catalyst is normal at the same NOx storage amount in the specific NOx trap catalyst is larger after the completion of the lean temperature raise process than after the completion of the rich temperature raise process.

Therefore, if abnormality diagnosis of the specific NOx trap catalyst is performed on the basis of the NOx storage efficiency of the specific NOx trap catalyst after the completion of the lean temperature raise process or a parameter correlating with this NOx storage efficiency, abnormality diagnosis of the specific NOx trap catalyst is performed in circumstances in which the difference between the value of the aforementioned parameter in the case where the specific NOx trap catalyst is deteriorated (or abnormal) and that in the case where the specific NOx trap catalyst is normal is increased. Therefore, the diagnosis that the specific NOx trap catalyst is abnormal can be made even when the degree of deterioration of the specific NOx trap catalyst is relatively small yet.

In the case where the lean temperature raise process is performed for abnormality diagnosis of the specific NOx trap catalyst also, the predetermined temperature set in the lean temperature raise process is not necessarily limited to temperatures at which NOx stored in the specific NOx trap catalyst is desorbed, as in the case where the lean temperature raise process is performed for abnormality diagnosis of the NSR catalyst. In other words, what is essential is that the predetermined temperature set in the lean temperature raise process is a temperature at which oxygen poisoning of the precious metal catalyst or coarsening of the NOx storage material occur in the specific NOx trap catalyst.

Second Embodiment

The general configuration of the internal combustion engine and its air-intake and exhaust systems according to the second embodiment are the same as those according to the first embodiment. When the lean temperature raise process is performed for the purpose of abnormality diagnosis of the NSR catalyst 6, NOx desorbed from the NSR catalyst 6 by the lean temperature raise process is emitted to the environment in some cases. In such cases, performing the abnormality diagnosis of the NSR catalyst 6 leads to an increase in harmful exhaust emissions. In order to prevent such an increase in harmful exhaust emissions, in abnormality diagnosis of the NSR catalyst 6 according to the second embodiment, the NOx reduction process is performed by the NOx reduction performing unit 101, before the lean temperature raise process is performed by the lean temperature raise performing unit 102.

Figure 11:
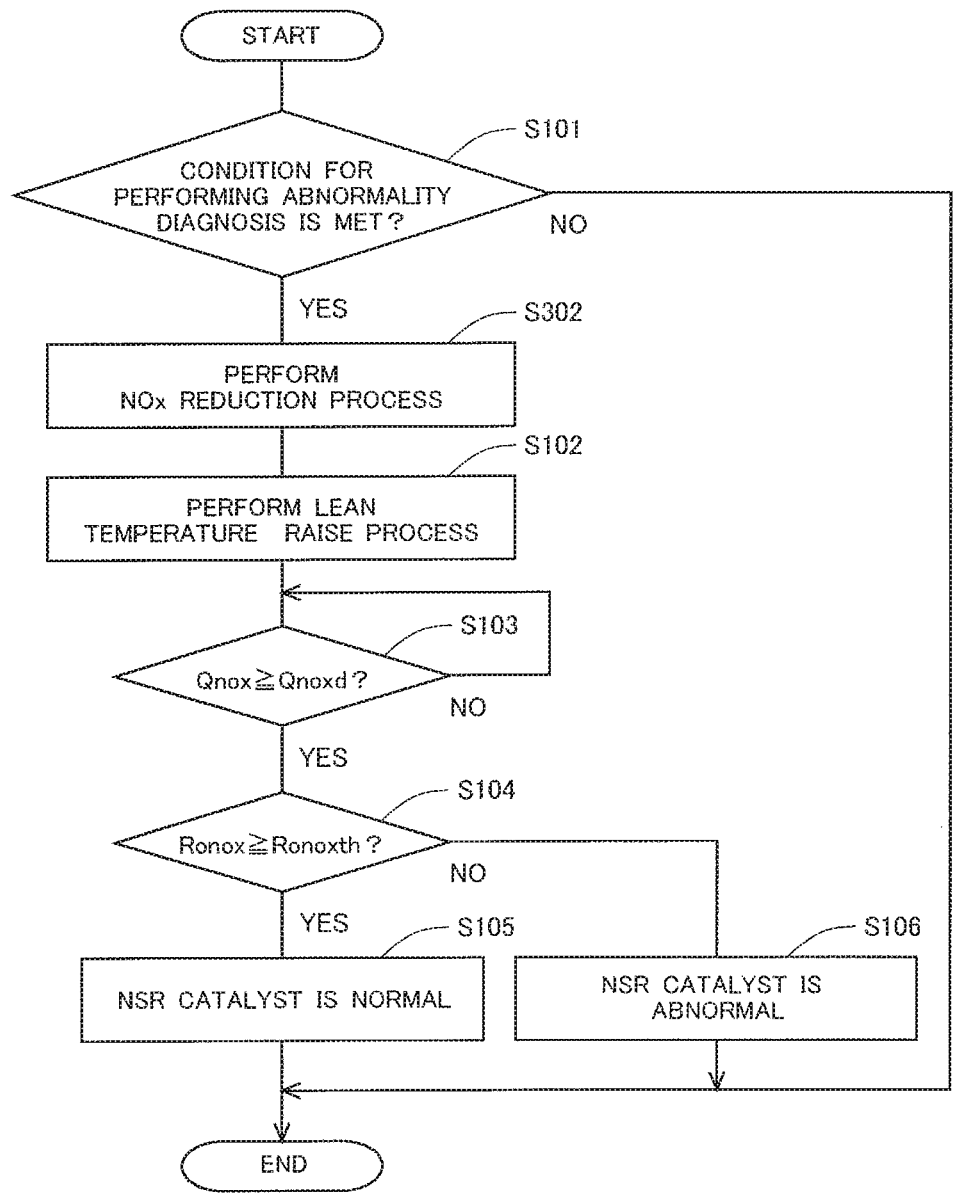
FIG. 11 is a flow chart of a process of abnormality diagnosis of an NSR catalyst according to a second embodiment.

FIG. 11 is a flow chart showing the process of abnormality diagnosis of the NSR catalyst according to this embodiment. This process is implemented by executing a program stored in the ECU 10. The processing executed in the steps other than step S302 in the process shown in FIG. 11 is the same as the processing executed in the steps denoted by the same reference signs in the abnormality diagnosis process shown in FIG. 7, and so the processing of these steps will not be described further.

In this process, if an affirmative determination is made in step S101, in other word, if the condition for performing abnormality diagnosis of the NSR catalyst 6 is met, the processing of step S302 is executed next. In step S302, the NOx reduction process is performed by the NOx reduction performing unit 101. Specifically, the NOx reduction performing unit 101 controls the quantity of fuel injected by the secondary fuel injection through the fuel injection valve of each cylinder of the internal combustion engine 1 in such a way as to adjust the air-fuel ratio of the inflowing exhaust gas to a specific reductive air-fuel ratio. The NOx reduction process is performed for a specific reduction process time. The specific reduction process time is a length of time that is considered to be long enough for the NOx storage amount in the NSR catalyst 6 to decrease to substantially zero. The specific reduction process time may be a fixed length of time that is determined in advance by, for example, experiment. Alternatively, the specific reduction process time may be determined on the basis of the NOx storage amount in the NSR catalyst 6 at the time when an affirmative determination is made in step S101. As the NOx reduction process is performed as above in step S302, NOx stored in the NSR catalyst 6 is desorbed and reduced.

After the NOx reduction process has been performed for the specific reduction process time in step S302, the NOx reduction process is ended. Then in step S102, the lean temperature raise process is performed by the lean temperature raise performing unit 102. In this case, the NOx storage amount in the NSR catalyst 6 is substantially zero at the time when the lean temperature raise process is started. Therefore, the predetermined temperature raise process time in performing the lean temperature raise process in step S102 is set as a predetermined fixed length of time. After the lean temperature raise process has been performed for the predetermined temperature raise process time in step S102, the processing of step S103 and the succeeding steps is performed.

In the above described process, when abnormality diagnosis of the NSR catalyst 6 is performed, the NOx reduction process is performed by the NOx reduction performing unit 101, before the lean temperature raise control is performed by the lean temperature raise performing unit 102. In consequence, the lean temperature raise process is performed in circumstances in which the NOx storage amount in the NSR catalyst 6 is substantially zero. This can prevent or reduce emission of NOx desorbed from the NSR catalyst 6 by the lean temperature raise process to the environment. Thus, an increase in harmful exhaust emissions in performing abnormality diagnosis of the NSR catalyst 6 can be prevented.

Even in the case where the lean temperature raise process is performed in circumstances in which the NOx storage amount in the NSR catalyst 6 is substantially zero, oxygen poisoning of the precious metal catalyst 51 and coarsening of the NOx storage material 52 can occur in the NSR catalyst. Therefore, in the abnormality diagnosis of the NSR catalyst 6 according to this embodiment, in which abnormality of the NSR catalyst 6 is diagnosed on the basis of the NOx storage efficiency of the NSR catalyst 6 after the completion of the lean temperature raise process abnormality diagnosis of the NSR catalyst 6 is performed in circumstances in which the difference between the NOx storage efficiency in the case where the NSR catalyst 6 is deteriorated and that in the case where the NSR catalyst 6 normal is increased, as in the first embodiment. Therefore, the diagnosis that the NSR catalyst 6 is abnormal can be made even when the degree of deterioration of the NSR catalyst 6 is relatively small yet.

In this embodiment also, the parameter that can be used in abnormality diagnosis of the NSR catalyst 6 is not limited to the NOx storage efficiency of the NSR catalyst 6. A certain parameter correlating with the NOx storage efficiency of the NSR catalyst 6 after the completion of the lean temperature raise process may be used as a parameter in abnormality diagnosis of the NSR catalyst 6, as in the first embodiment.

Third Embodiment

Figure 12:
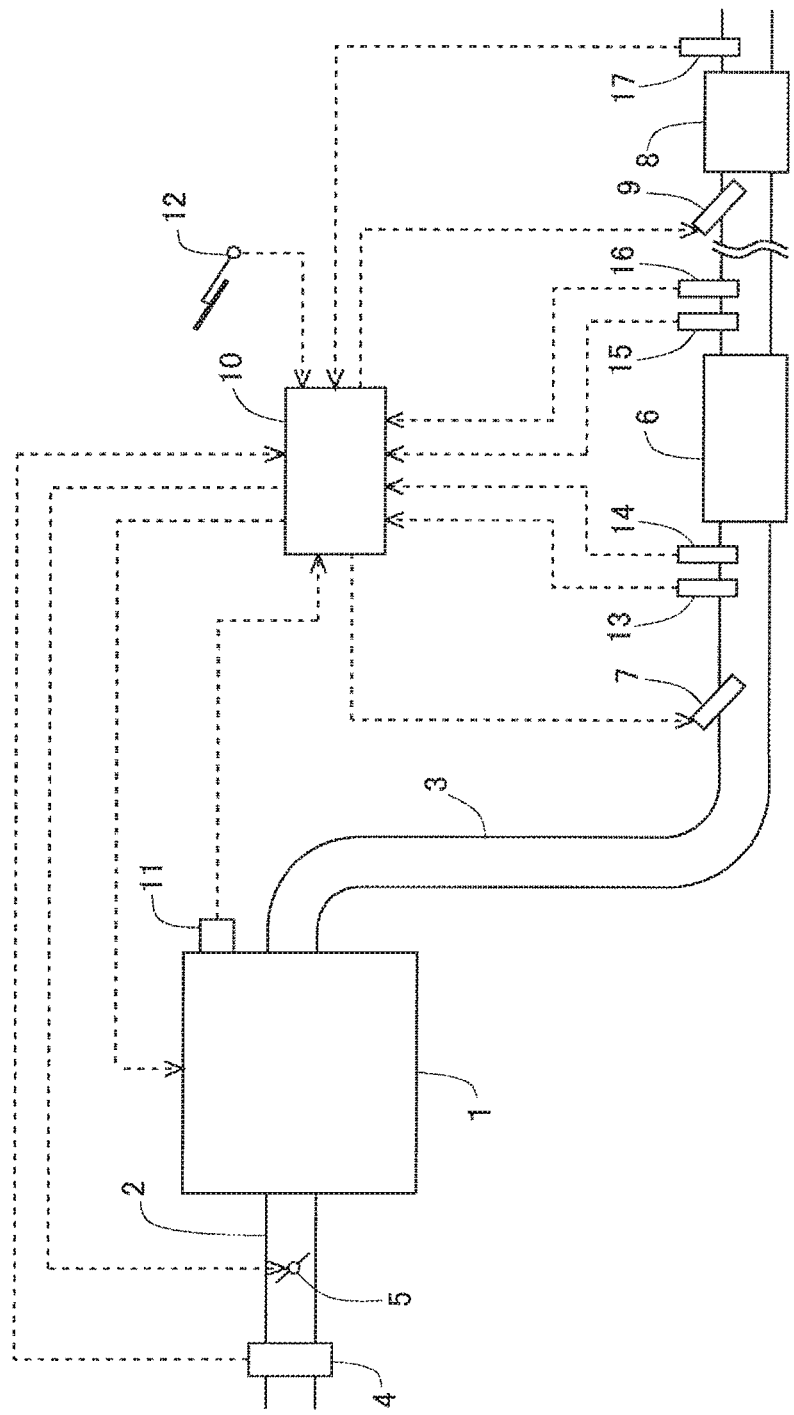
FIG. 12 is a diagram showing the general configuration of an internal combustion engine and its air-intake and exhaust systems according to a third embodiment.

FIG. 12 is a diagram showing the general configuration of the air-intake and exhaust systems of an internal combustion engine according to a third embodiment. In the following, only the components and features of the air-intake and exhaust systems of the internal combustion engine according to this embodiment that are difference from those shown in FIG. 1 will be described.

In this embodiment, an SCR catalyst 8 is provided in the exhaust passage 3 downstream of the downstream NOx sensor 15 and the temperature sensor 16. Furthermore, a urea addition valve 9 that adds urea solution to the exhaust gas is provided in the exhaust passage 3 downstream of the downstream NOx sensor 15 and the temperature sensor 16 and upstream of the SCR catalyst 8. The Urea addition valve 9 is electrically connected with the ECU 10 and controlled by the ECU 10. In the SCR catalyst 8, NOx in the exhaust gas is reduced by ammonia functioning as a reducing agent, which is produced by hydrolysis of urea added through the urea addition valve 9.

Moreover, a temperature sensor 17 is provided in the exhaust passage 3 downstream of the SCR catalyst 8. This temperature sensor 17 measures the temperature of the exhaust gas flowing out of the SCR catalyst 8. The temperature sensor 17 is electrically connected with the ECU 10, and its measurement value is input to the ECU 10. The ECU 10 calculates the temperature of the SCR catalyst 8 from the measurement value of the temperature sensor 17.

In this embodiment, the SCR catalyst 8 is disposed at a location in the exhaust passage 3 a predetermined distance or more away from the NSR catalyst 6. For example, while the NSR catalyst 6 is disposed in the engine room, the SCR catalyst 8 is disposed under the floor of the vehicle outside the engine room. This arrangement prevents the temperature or the SCR catalyst 8 from rising even when the temperature of the NSR catalyst 6 is raised by performing the lean temperature raise process. The SCR catalyst 8 exercises its NOx reducing function satisfactorily when its temperature is in a specific reductive temperature range.

In this embodiment, when performing the lean temperature raise process, the lean temperature raise performing unit 102 raises the temperature of the NSR catalyst 6 to or above a predetermined temperature while keeping the temperature of the SCR catalyst 8 within a specific reductive temperature range. In consequence, even though NOx is desorbed from the NSR catalyst 6 as the lean temperature raise process is performed, the desorbed NOx is reduced by the SCR catalyst 8. Thus, it is possible to reduce the quantity of NOx that is desorbed from the NSR catalyst 6 and emitted to the environment when the lean temperature raise control is performed.

In this embodiment, the SCR catalyst 8 may be replaced by an NSR catalyst, which will be referred to as the downstream NSR catalyst. When performing the lean temperature raise process, the lean temperature raise performing unit 102 raises the temperature of the NSR catalyst 6 to or above the predetermined temperature while keeping the temperature of the downstream NSR catalyst within a specific storage-enabling temperature range in which the NSR catalyst can exercise the NOx storage function satisfactorily. In consequence, even though NOx is desorbed from the NSR catalyst 6 as the lean temperature raise process is performed, the downstream NSR catalyst can store the desorbed NOx. Thus, it is possible to reduce the quantity of NOx that is desorbed from the NSR catalyst 6 and emitted to the environment when the lean temperature raise control is performed. The NOx stored in the downstream NSR catalyst can be reduced by decreasing the air-fuel ratio of the exhaust gas flowing into the downstream NSR catalyst to a reductive air-fuel ratio.

REFERENCE SIGNS LIST

1: internal combustion engine
2: intake passage
3: exhaust passage
4: air flow meter
5: throttle valve
6: NSR catalyst (NOx storage reduction catalyst)
7: fuel addition valve
8: SCR catalyst (selective catalytic reduction NOx catalyst)
9: urea addition valve
10: ECU
11: crank angle sensor
12: accelerator opening degree sensor
13: upstream NOx sensor
14: air-fuel ratio sensor
15: downstream NOx sensor
16: temperature sensor
17: temperature sensor

What is claimed is:

1. An abnormality diagnosis system for an exhaust gas purification apparatus including an NOx trap catalyst prodded in an exhaust passage of an internal combustion engine that operates in a lean burn mode to store NOx in exhaust gas, comprising:
  a controller comprising at least one processor configured to
  perform a lean temperature raise process, which is the process of raising the temperature of said NOx trap catalyst to above predetermined temperature while keeping the air-fuel ratio of the exhaust gas flowing into said NOx trap catalyst at a lean air-fuel ratio higher than the theoretical air-fuel ratio, when a specific abnormality diagnosis condition is met; and
  diagnose abnormality of said NOx trap catalyst on the basis of the NOx storage efficiency of said NOx trap catalyst or a parameter correlating with that NOx storage efficiency after the completion of said lean temperature raise process.

2. An abnormality diagnosis system for an exhaust gas purification apparatus according to claim 1, wherein said predetermined temperature is a temperature at which NOx stored in said NOx trap catalyst can be desorbed when the air-fuel ratio of the exhaust gas flowing into said NOx trap catalyst is a lean air-fuel ratio.

3. An abnormality diagnosis system for an exhaust gas purification apparatus according to claim 2, wherein
  said NOx trap catalyst is an NOx storage reduction catalyst,
  said controller further performs an NOx reduction process, which is the process of reducing NOx stored in said NOx trap catalyst by decreasing the air-fuel ratio of the exhaust gas flowing into said NOx trap catalyst to a reductive air-fuel ratio equal to or lower than the theoretical air-fuel ratio at which NOx can be reduced, and
  when said specific abnormality diagnosis condition is met, said controller performs the NOx reduction process, and then performs said lean temperature raise process.

4. An abnormality diagnosis system for an exhaust gas purification apparatus according to claim 2, wherein
  said exhaust gas purification apparatus further includes an NOx reduction catalyst disposed in said exhaust passage downstream of said NOx trap catalyst at a location a predetermined distance or more away from said NOx trap catalyst, said NOx reduction catalyst being a selective catalytic reduction NOx catalyst or an NOx storage reduction catalyst, and
  when performing said lean temperature raise process, said controller raises the temperature of said NOx trap catalyst to or above said predetermined temperature while keeping the temperature of said NOx reduction catalyst within a specific reduction-enabling temperature range in which said NOx reduction catalyst can reduce NOx in the case where said NOx reduction catalyst is a selective catalytic reduction NOx catalyst or while keeping the temperature of said NOx reduction catalyst within a specific storage-enabling temperature range in which said NOx reduction catalyst can store NOx in the case where said NOx reduction catalyst is an NOx storage reduction catalyst.

5. An abnormality diagnosis system for an exhaust gas purification apparatus according to claim 1, wherein said NOx trap catalyst is an NOx storage reduction catalyst, said controller further performs an NOx reduction process, which is the process of reducing NOx stored in said NOx trap catalyst by decreasing the air-fuel ratio of the exhaust gas flowing into said NOx trap catalyst to a reductive air-fuel ratio equal to or lower than the theoretical air-fuel ratio at which NOx can be reduced, and when said specific abnormality diagnosis condition is met, said controller performs the NOx reduction process, and then performs said lean temperature raise process.

6. An abnormality diagnosis system for an exhaust gas purification apparatus according to claim 1, wherein said exhaust gas purification apparatus further includes an NOx reduction catalyst disposed in said exhaust passage downstream of said NOx trap catalyst at a location a predetermined distance or more away from said NOx trap catalyst, said NOx reduction catalyst being a selective catalytic reduction NOx catalyst or an NOx storage reduction catalyst, and when performing said lean temperature raise process, said controller raises the temperature of said NOx trap catalyst to or above said predetermined temperature while keeping the temperature of said NOx reduction catalyst within a specific reduction-enabling temperature range in which said NOx reduction catalyst can reduce NOx in the case where said NOx reduction catalyst is a selective catalytic reduction NOx catalyst or while keeping the temperature of said NOx reduction catalyst within a specific storage-enabling temperature range in which said NOx reduction catalyst can store NOx in the case where said NOx reduction catalyst is an NOx storage reduction catalyst.

* * * * *